(12) United States Patent
Shim et al.

(10) Patent No.: US 6,584,086 B1
(45) Date of Patent: Jun. 24, 2003

(54) METHOD OF CONTROLLING FORWARD POWER OF MOBILE COMMUNICATIONS SYSTEM

(75) Inventors: Sung-Goo Shim, Kyoungki-do (KR); Tai-Hoon Kim, Kyoungki-do (KR); Hyun-Ah Kwon, Seoul (KR)

(73) Assignee: Hyundai Electronics Ind. Co. Ltd., Kyoungki-do (KR)

( * ) Notice: Subject to any disclaimer, the term of this patent is extended or adjusted under 35 U.S.C. 154(b) by 0 days.

(21) Appl. No.: 09/063,554

(22) Filed: Apr. 21, 1998

(30) Foreign Application Priority Data

Apr. 22, 1997 (KR) .............................. 97-14965

(51) Int. Cl.[7] .............................................. H04B 7/216
(52) U.S. Cl. ..................... 370/335; 370/342; 455/522; 455/69
(58) Field of Search ................. 370/320, 331, 370/332, 333, 335, 342; 375/140, 130, 131; 455/522, 68, 69, 436, 437, 438, 439, 440, 441, 442, 67, 1, 67.3

(56) References Cited

U.S. PATENT DOCUMENTS

| | | | |
|---|---|---|---|
| 5,287,349 A | | 2/1994 | Hyodo et al. |
| 5,450,411 A | | 9/1995 | Heil |
| 5,485,486 A | * | 1/1996 | Gilhousen .................... 375/200 |
| 5,822,318 A | * | 10/1998 | Tiedemann et al. ......... 455/403 |
| 5,842,113 A | * | 11/1998 | Nanda .......................... 455/69 |
| 5,884,187 A | * | 3/1999 | Ziv ............................... 455/69 |
| 5,893,035 A | * | 4/1999 | Chen ............................ 455/69 |
| 5,960,361 A | * | 9/1999 | Chen ............................ 455/69 |
| 6,075,974 A | * | 6/2000 | Saints .......................... 455/69 |
| 6,137,840 A | * | 10/2000 | Tiedemann ................... 455/69 |

* cited by examiner

Primary Examiner—Steven Nguyen
(74) Attorney, Agent, or Firm—J. Harold Nissen; Lackenbach Siegel

(57) ABSTRACT

Information on forward power is indicated in the erasure indicator bit of reverse traffic channel frame. A control station searches for the erasure indicator bit of reverse traffic channel frame transmitted from the a mobile, to judge if forward power control is required. The power is controlled according to a transmission rate previously stored when it is judged that the forward power control is required. The control station searches for the erasure indicator bit of reverse traffic channel frame again after the power control and varies the transmission rate according to the information on forward power, carrying out optimum forward power control.

6 Claims, 5 Drawing Sheets

FIG 4

Reverse Traffic Channel Frame Structure Summary

Figure 1:
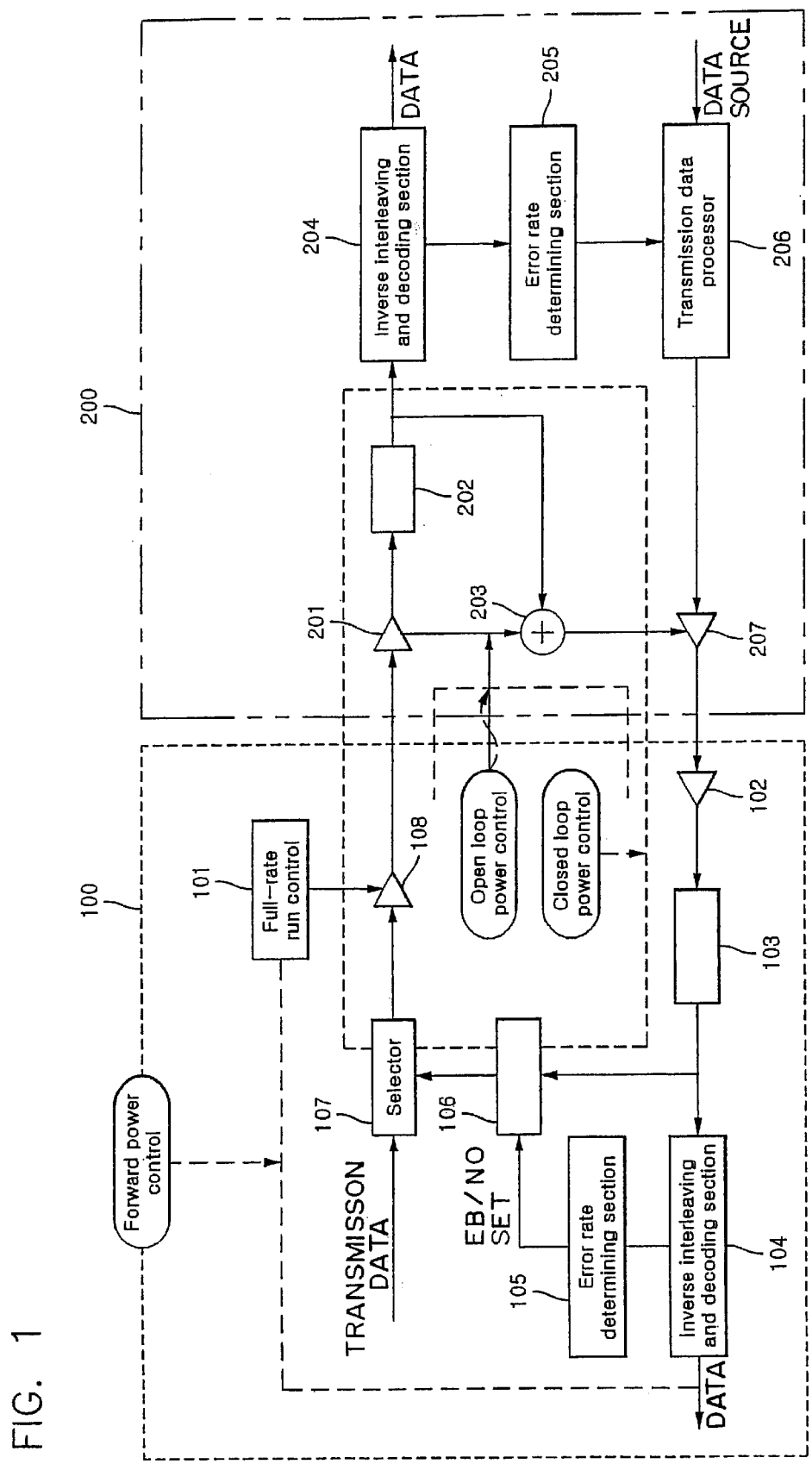

| RATE SET | Transmission Rate(bps) | Number of Bits Frame ||||
|---|---|---|---|---|---|
| | | Total | Erasure Indicator | Information | Frame Quality Indicator | Encoder Tail |
| 1 | 9600 | 192 | 0 | 172 | 12 | 8 |
| | 4800 | 96 | 0 | 80 | 8 | 8 |
| | 2400 | 48 | 0 | 40 | 0 | 8 |
| | 1200 | 24 | 0 | 16 | 0 | 8 |
| 2 | 14400 | 288 | 1 | 267 | 12 | 8 |
| | 7200 | 144 | 1 | 125 | 10 | 8 |
| | 3600 | 72 | 1 | 55 | 8 | 8 |
| | 1800 | 36 | 1 | 21 | 6 | 8 |

METHOD OF CONTROLLING FORWARD POWER OF MOBILE COMMUNICATIONS SYSTEM

BACKGROUND OF THE INVENTION

1. Field of the Invention

The present invention relates to power control in a mobile communications system, specifically, to a method of controlling forward power of a mobile communications system, in which forward power transmitted from a base station to a mobile is controlled using an erasure indicator bit of a reverse traffic channel frame.

2. Discussion of Related Art

In general, a CDMA system employs forward (from a base station to mobiles) power control and reverse (from mobiles to a base station) power control in order to maximize the number of users who can call in a specific bandwidth simultaneously and to obtain a predetermined amount of speech capacity, high speech quality and other advantages. The system capacity is maximized when the transmission power of each mobile is controlled to reach a base station, having a minimum signal-interference ratio. The transmission power of the mobile is controlled so that transmission signals of all mobiles in a zone are received by the base station's receiver in nominal intensity, thereby allowing more mobile to be able to communicate with the base station with higher speech quality. When the mobile's transmission power received by the base station is too low, bit error rate becomes very high. Thus, high speech quality cannot be obtained. On the contrary, when the reception power at the base station is too high, though the speech quality of the mobile becomes higher, interference to other mobiles using the same channel is increased. This deteriorates the speech quality unless the number of the entire subscribers is reduced.

The base station controls the forward power, corresponding to power measured at the mobiles, to support forward power control. The forward power control is for decreasing loss power in a mobile which is not busy or relatively close to the base station or less affected by multipath fading and radio wave shading effect or hardly receives interference of other base stations. For mobiles which are located in an area with difficult in reception or in the distance so as to have high error rate, additional power support is provided. The forward power control in an 800 MHz CDMA system uses a power measurement report message (PMRM). When the system informs a mobile of when the PMRM will be transmitted by selecting one of three operation modes (1;transmit the PMRM when the number of bad frames received by the mobile exceed a critical value, 2;transmit the PMRM periodically, 3;transmit the PMRM periodically even when the number of bad frames exceed the critical value), the mobile transmits the PMRM according to the selected operation mode. Then, a control station receives the PMRM to control the power, and informs the base station of it. The base station transmits signals to the mobile with the corrected power.

In the aforementioned conventional power control method, it takes considerable time for the mobile to transmit the PMRM. Accordingly, it is difficult to control the power rapidly in circumstances of sudden change of propagation environment. The critical value can be set to allow the mobile to transmit the PMRM unconditionally when the bad frame occurs. However, since the PMRM is a message, when the mobile receives the bad frame, it should inform the control station immediately through a method a method other than messaging in order to control the power rapidly.

U.S. Pat. No. 5,629,934 discloses a power control method using three power control bits. J-STD-008 which is a part of the standard of personal communication system (PCS) using CDMA includes a method of controlling forward channel power using PMRM, in which an erasure indicator (referred to as EI hereinafter) bit is put in the reverse frame of multiplex option 2 (referring to FIG. 4), and, when the mobile receives the bad frame, frames are transmitted, setting the EI bit located two frames behind to 1. However, the J-STD-008 does not contain how the EI bit is used.

As described above, in the conventional forward power control method, rapid power control cannot be performed in the circumstances of sudden change of propagation environment because it takes considerable time for the mobile to transmit the PMRM. Furthermore, though the critical value can be set to allow the mobile to transmit the PMRM unconditionally when the bad frame occurs, it takes time to use power control routine in call processing after pasing because the PMRM is a message. Moreover, when the bad frame occurs continuously, the control station's traffic channel processor which deals with eight mobiles simultaneously is difficult to operate.

SUMMARY OF THE INVENTION

Accordingly, the present invention is directed to a method of controlling forward power of a mobile communications system that substantially obviates one or more of the problems due to limitations and disadvantages of the related art.

An object of the present invention is to provide a method of controlling forward power of a mobile communications system, in which a control station controls the forward power using EI bit of reverse traffic channel frame.

Another object of the present invention is to provide a method of controlling forward power of a mobile communications system, which stabilizes calls in a rapidly changing propagation environment or hand off condition where a mobile moves rapidly.

A still another object of the present invention is to provide a method of controlling forward power of a mobile communications system, in which power control information is transmitted to the base station using the EI bit of reverse traffic channel frame, to allow the control station to control the forward power.

To accomplish the objects of the present invention, there is provided a method of controlling forward power of a mobile communications system comprising the steps of searching for EI bit of reverse traffic channel frame transmitted from a mobile, controlling forward power according to a transmission rate previously stored when it is judged that forward power control is required from the result of searching for EI bit, and searching for EI bit of reverse traffic channel frame after the controlling of forward power and varying the transmission rate according to the result of searching.

The mobile indicates information on forward power in the EI bit of reverse traffic channel frame. The control station searches for this EI bit, to judge whether forward power control is required or not. When it is judged that forward power control is required from the result of searching, the control station controls the forward power with large power increasing value BIG-UP and large power decreasing value BIG-DOWN when transmission is made at a full rate, and controls it with small power increasing value SMALL-UP and small power decreasing value SMALL-DOWN when transmission is carried out at a rate of below the full rate.

It is to be understood that both the foregoing general description and the following detailed description are exemplary and explanatory and are intended to provide further explanation of the invention as claimed.

BRIEF DESCRIPTION OF THE ATTACHED DRAWINGS

Figure 2A:
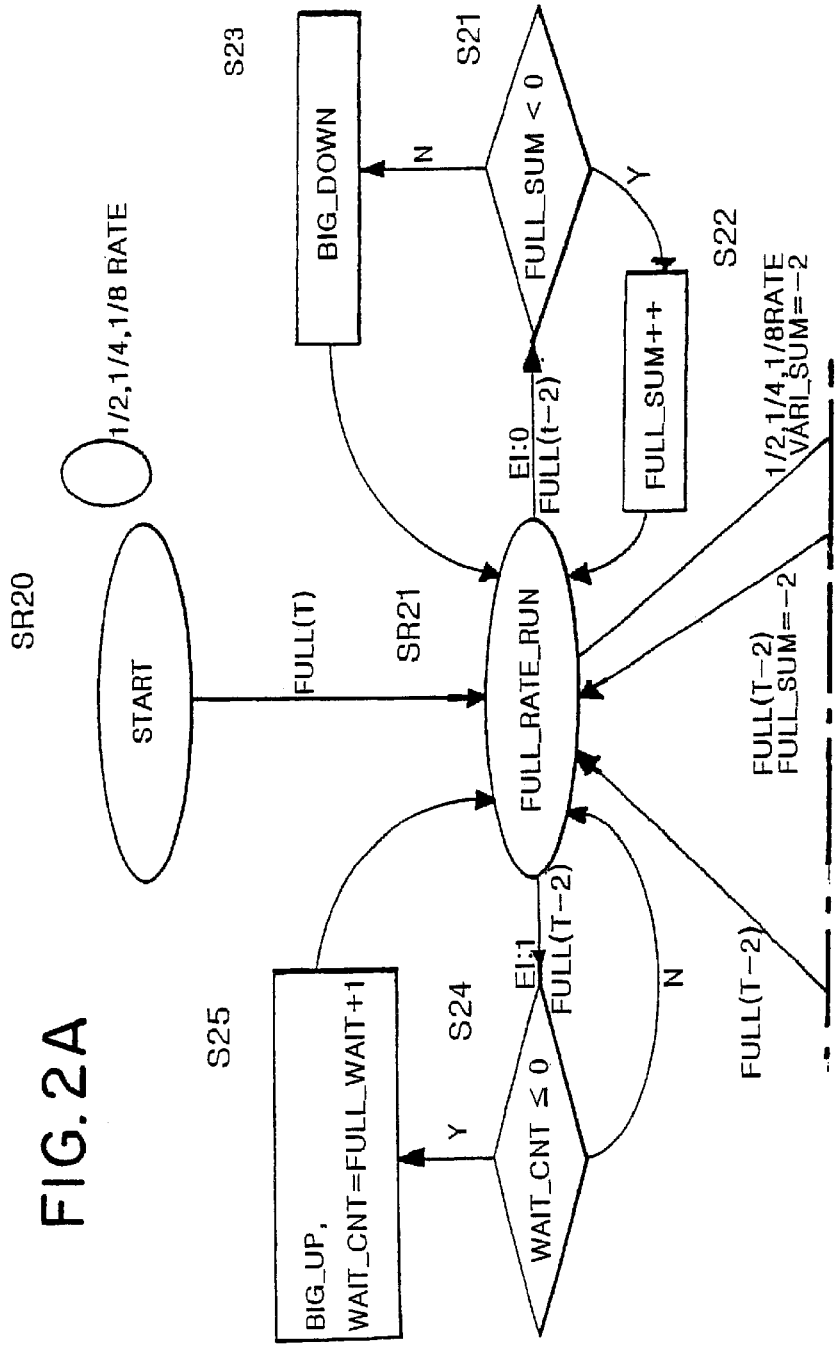
Figure 2B:
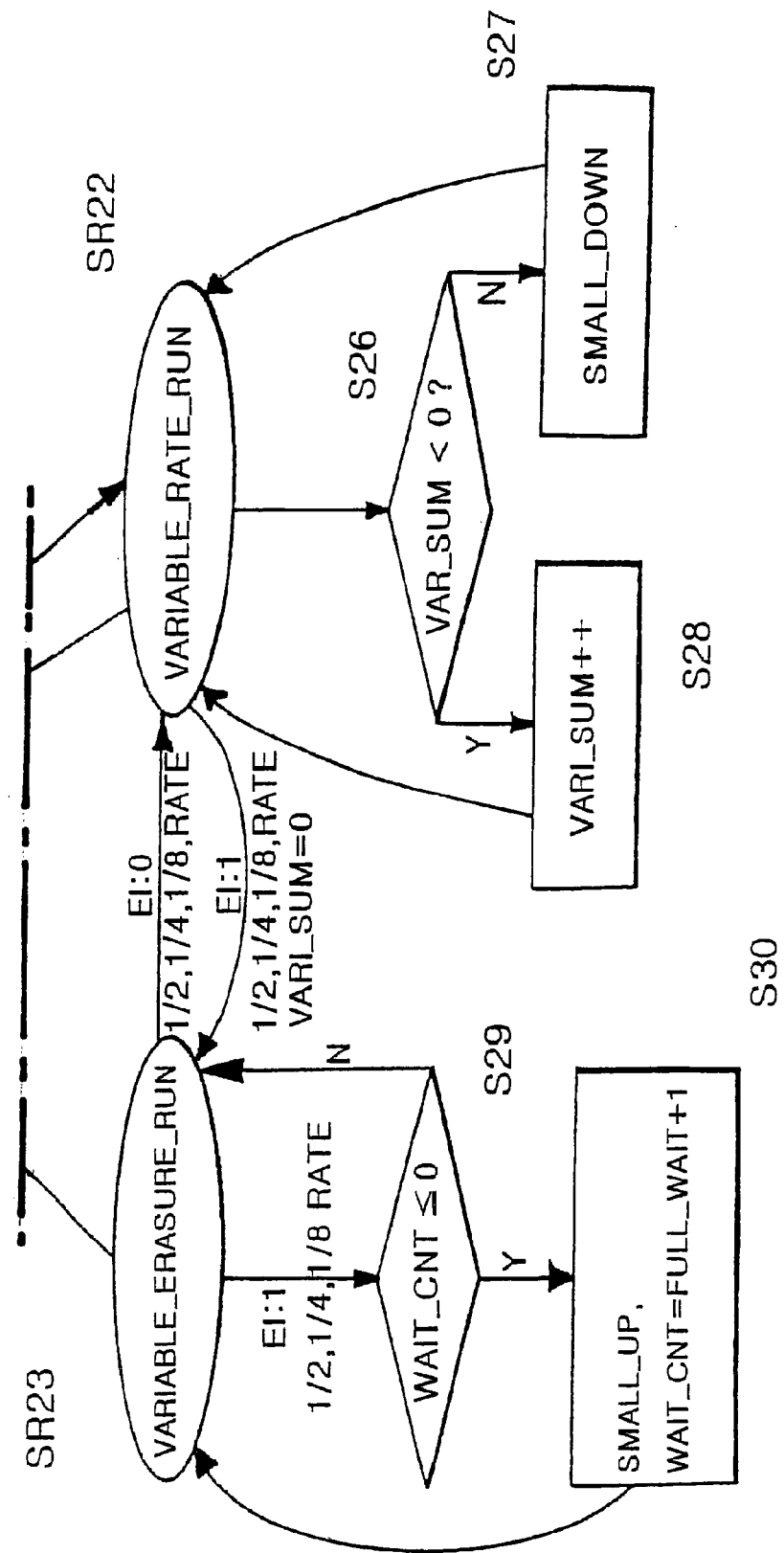
Figure 3:
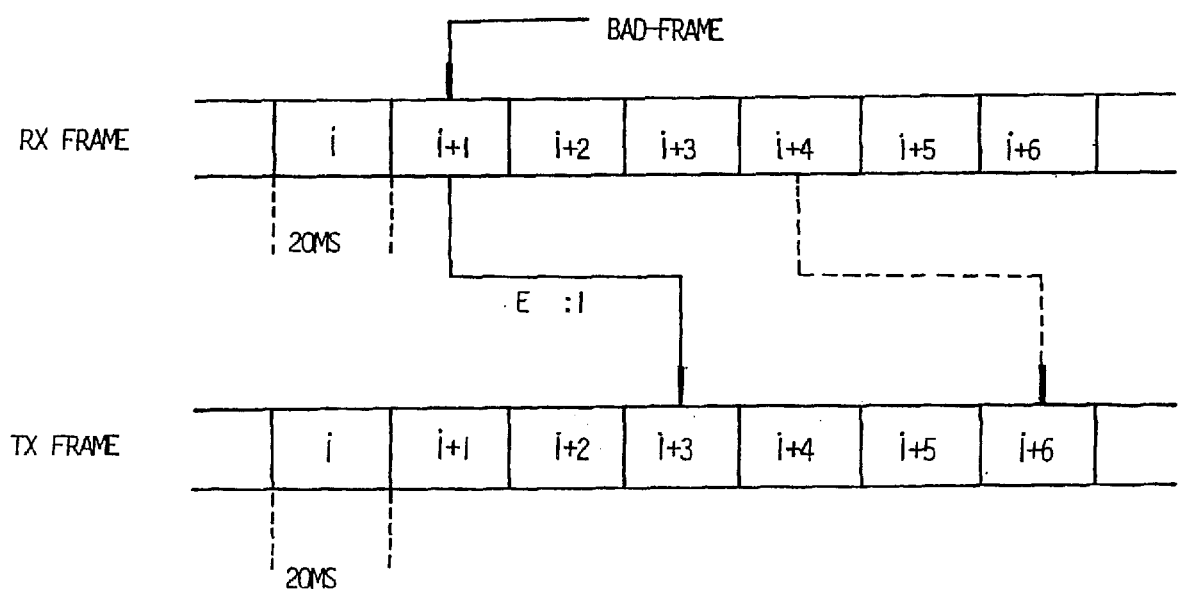

The accompanying drawings, which are included to provide a further understanding of the invention and are incorporated in and constitute a part of this specification, illustrate embodiments of the invention and together with the description serve to explain the principles of the invention:

In the drawings:

FIG. 1 is a block diagram showing a power controlling apparatus of a CDMA mobile communications system according to an embodiment of the present invention;

FIG. 2 includes FIGS. 2A and 2B and together is a diagram showing transition of control state of forward power in a mobile communications system according to the present invention;

FIG. 3 is a diagram showing transmission/reception frame format of a mobile of a mobile communications system according to the present invention; and FIG. 4 is a diagram showing a reverse traffic channel frame format of a PCS using CDMA.

DETAILED DESCRIPTION OF PREFERRED EMBODIMENT

Reference will now be made in detail to the preferred embodiments of the present invention, examples of which are illustrated in the accompanying drawings.

FIG. 1 is a block diagram of a power controlling apparatus of a mobile communications system to which the present invention is applied. Referring to FIG. 1, the apparatus includes a base station's processing section 100 and mobile's processing section 200. Base station's processing section 100 comprises a transmission power controller 101 for controlling forward power, an amplifier 102, a demodulator 103 for demodulating a signal which has past through amplifier 102, an inverse interleaving and decoding section 104 for inverse-interleaving and decoding a signal which has past demodulator 103, an error rate determining section 105 for determining an error rate from the output signal of inverse interleaving and decoding section 104, a signal-noise ratio detector 106 for detecting signal-noise ratio from the output signals of error rate determining section 105 and demodulator 103, a selector 107 for selecting one of the output signal of signal-noise ratio detector 106 and transmission data, and a variable transmission rate high power amplifier 108 for varying the transmission rate of the output signal of selector 107 under the control of transmission power controller 101.

Mobile's processing section 200 comprises an automatic gain control amplifier 201 for controlling the gain of a signal transmitted from the base station, a demodulator 202 for demodulating a signal which has past automatic gain control amplifier 201, an adder 203 for adding the output signal of demodulator 202 to output signal of automatic gain control amplifier 201, an inverse interleaving and decoding section 204 for inverse-interleaving and decoding a signal which has past demodulator 202, an error rate determining section 205 for determining an error rate from the output signal of inverse interleaving and decoding section 204, a transmission data processor 206 for processing data to be transmitted according to the output signal of error rate determining section 105, and a variable transmission rate high power amplifier 207 for varying the power of the transmission data output from transmission data processor 206 according to the output signal of adder 203.

The power control apparatus of a CDMA mobile communications system, constructed as above, controls power according to reverse open loop power control, reverse closed loop power control and forward power control modes. In the reverse open loop power control mode which is an execution function of the mobile primarily, the mobile rapidly controls transmission power corresponding to variation in reception power from the base station. The mobile measures the power received from the base station, and controls the transmission power inversely proportional to the magnitude of the reception power. The open loop power control mode allows the transmission signals of all mobiles to be received by the base station with an identical standard. The base station provides the mobiles with correction factors by mobiles, to support the open loop control function. The correction factor has close relation to the load of the base station, noise factor of the base station, antenna gain and power amplifier, and it is transmitted from the base station to mobiles as a part of broadcasting message.

In the reverse closed loop power control mode, the base station performs active functions. The closed loop allows the base station to fix presumptive power rapidly, to make the mobile maintain the optimum transmission power. The base station receives the signal of related mobile, compares it with a variable critical value, and sends power increase or decrease command to the mobile every 1.25 ms according to the compared result. The correction of the closed loop value which corrects the presumptive value of the open loop compensates for gain tolerance and propagation loss which is different on forward and reverse links.

A process of controlling forward power using the power controlling apparatus executing the aforementioned function according to the present invention is explained below with reference to FIGS. 2 and 3. First of all, upon setting of basic call, forward power control starts and, in an initialization routine SR20, a wait count flag WAIT_CNT is set to 0, wait setting flag FULL_WAIT to 2, full-rate transmission flag FULL_SUM to −2 and variable transmission flag VARI-SUM to −2. It is impossible for the call to be made at the full rate right after it starts. Thus, the call is made at ½, ¼ or ⅛ of the full rate, remaining in starting state. When the call is sufficiently established, the process proceeds to a full-rate run routine SR21.

In full-rate run routine SR21, the control station checks EI bit in the reverse traffic channel frame transmitted from the mobile, and, when the EI bit is "0", proceeds to a step S21. In step S21, a control station's traffic processor transmits forward a frame every 20 ms, storing the transmission rate up to two. When the mobile recognizes the frame received as a bad frame, the control station's traffic processor sends the frame to which the EI bit is set after the laps of 40 ms, as shown in FIG. 3. Thus, the control station's traffic processor stores the transmission rates of i+1 and i+2, and then confirms i+1 previously stored when the EI bit received is 1 at i+3 and controls power depending on corresponding transmission rate. Here, large power increasing value BIG-UP and large power decreasing value BIG-DOWN are used when the transmission rate is full, and small power increasing value SMALL-UP and small power decreasing value SMALL-DOWN are used when it is less than the full rate.

In the full-rate run state, the forward frame is continuously transmitted at the full rate. The power control value is reduced with the large power decreasing value BIG-DOWN when the EI bit received is 0, and it is raised with the large power increasing value BIG-UP when the EI bit is 1, as described below. When the control value increases (that is, power increases), waiting for a period of time (FULL-WAIT)+1 is required in order to confirm the effect obtained from the increase in the control value. For example, when the EI bit is received from i+3 as 1, the power control value is increased at i+4 and its effect appears at i+6.

In step 21, it is judged that if full-rate count flag FULL_SUM which indicates that for how many frame the full rate continues is less than 0. When it is less than 0, full-rate count flag FULL_SUM is increased by 1 in a step S22 and full-rate run routine SR21 is executed. When the full rate state is repeated twice continuously, the full-rate count flag FULL_SUM becomes larger than 0 because its initial value is set to −2. When the full-rate count flag FULL_SUM is not less than 0, forward transmission power is reduced by the large power decreasing value BIG_DOWM in a step S23 and full-rate run routine SR21 is executed. When the control station checks the EI bit in the reverse traffic channel frame and receives it as "1", the process proceeds to step a S24. What the EI bit is received as "1" means that the frame received by the mobile is in a bad frame state (reception error state). It is judged if the wait count flag WAIT_CNT is less than or equal to 0 in step S24. When the wait count flag is less than or equal to 0, it indicates that the period of one frame does not pass, repeating step S24. When the wail count flag is larger than 0, it is set as wait setting flag (FULL_WAIT)+1, and forward transmission power is increased by the large power increasing value BIG UP, thereby raising the forward transmission power.

Meantime, when propagation environments change or speech tone decreases while line is busy, if the forward frame starts to be transmitted at a rate lower the full rate, ½, ¾ or ⅛ of the full rate, the process enters a variable-rate-run routines (SR22). In this state, when the frame starts to be transmitted at the full rate, the process returns to the full-rate-run routine. When the EI bit starts to be received as "0", the forward power value is reduced with the small power decreasing value SMALL-DOWN in steps S26, S27 and S28, and, when the EI bit received becomes "1", entering variable-erasure-run routine (S23).

When the propagation environments change or speech tone decreases while line is busy, the frame is transmitted at ½, ¾ or ⅛ of the full rate, proceeding to variable rate run routine (SR22). In this variable rate run routine state, when the control station checks the EI bit in the reverse channel frame and receives it as "0", the process proceeds to step S26. What the EI bit is received as "0" means that the frame received by the mobile is not in the bad frame-state. In step S26, it is judged that if variable transmission count flag VARI_SUM is less than or equal to 0. When variable transmission count flag VARI_SUM is less than or equal to identical to 0, it is increased by 1 and variable rate run routine S22 is performed in step S28. Variable transmission count flag VARI_SUM becomes larger than 0 when the full rate state is repeated twice continuously because its initial value is set to −2. When variable transmission count flag VARI_SUM is not less than 0, the forward transmission power is decreased by small power decreasing value SMALL_DOWN and variable rate run routine SR22 is carried out step S27.

When the control station checks the EI bit in the reverse channel frame and receives it as "1" in variable rate run routine SR22, the process proceeds to variable erasure run routine SR23. When full-rate transmission starts in this variable erasure run routine SR23, the process returns to full-rate run routine SR21. When the EI bit is 0 and transmission starts at a rate of below the full rate, the process returns to variable rate run routine SR22. On the contrary, when the EI bit received is 1, the forward power is increased with small power increasing value SMALL-UP, waiting for a period of time (FULL-WAIT)+1in steps S29 ad S30.

It is judged if the wait count flag WAIT_CNT is less than or equal to 0 in step S29. What the wait count flag is less than or equal to 0 means that the period of one frame does not pass so that the process returns to variable rate run routine SR23 and waits. When wait count flag WAIT_CNT is larger than 0, it is set as wait setting flag (FULL_WAIT)+1in step S30 and forward transmission power is increased by large power increasing value BIG_UP, raising the forward transmission power. The wait setting flag FULL_WAIT does not become 0 again until a period of frame of (FULL_WAIT)+1=3 passes because its initial value is set to 2.

In consequence, the forward power is controlled by large power increasing value BIG-UP and large power decreasing value. BIG-DOWN when the full-rate transmission is carried out by the control station's traffic channel processor, and it is controlled by small power increasing value SMALL-UP and small power decreasing value SMALL-DOWN when the transmission is made at a rate of below the full rate. Since there no reference for the control values such as BIG-UP, BIG-DOWN, SMALL-UP and SMALL-DOWN, these values are obtained by correcting values used by conventional 800 MHz CDMA systems and making them pass through various tests.

As described above, the present invention controls forward power using the EI bit in the reverse traffic channel frame transmitted from the mobile, to stabilize calling even in rapidly changing propagation environments or hand off condition where the mobile moves rapidly. Furthermore, since the power is used just as much as needed, power control value is most suitable all the time, removing interference to other mobiles. Accordingly, it is possible to increase the subscriber accommodation capacity per cell.

It will be apparent to those skilled in the art that various modifications and variations can be made in the method of controlling forward power of a mobile communications system of the present invention without departing from the spirit or scope of the invention. Thus, it is intended that the present invention cover the modifications and variations of this invention provided they come within the scope of the appended claims and their equivalents.

What is claimed is:

1. A method of controlling forward power of a mobile communication system, comprising the steps of:

searching for an EI (erasure indicator) bit of reverse traffic channel frame by a control station, to determine if forward power control is required or not, the reverse traffic channel frame being transmitted from a mobile;

controlling the forward power according to a transmission rate previously stored when the control station determines if a power control is required; and searching for the EI bit of reverse traffic channel frame after the controlling of forward power and varying the transmission rate according to information on a forward powers, wherein a variable rate run state and variable erasure run state of a full-rate run state are selectively transferred, to control the forward power, and the large power decreasing value BIG-DOWN when the EI bit of the reverse channel frame is continuously received as "0", and the power control value is raised with the large power increasing value BIG-UP after waiting of a predetermined period of frame when the EI bit is received as "1", and wherein in order to confirm the effect of an increase in the power control value, the control station determines if a power control is required after waiting of a predetermined period of time (FULL-WAIT)+1.

2. The method as claimed in claim 1, wherein the control station determines that power control is required if the EI bit of reverse channel frame equals "1".

3. The method as claimed in claim 1, wherein the forward power is controlled with a large power increasing value BIG-UP and large power decreasing value BIG-DOWN when the traffic channel processor of the control station controls power during full-rate transmission, and the forward power is controlled with a small power increasing value SMALL-UP and small power decreasing value SMALL-DOWN when the control station's traffic channel processor controls power during transmission made at a rate of below the full rate.

4. The method as claimed in claim 1, wherein the predetermined period time corresponds to a time during which the power control is carried out and the result of the power control is indicated in the EI bit of the reverse traffic channel frame.

5. A method of controlling forward power of a mobile communication system, comprising the steps of:

(a) proceeding to a full-rate run routine when basic call is set up, to establish a call at a full rate;

(b) checking EI bit of reverse traffic channel frame by a control station, counting the number of frames at the full-rate run when the EI bit is "0" and reducing the forward power with large power decreasing value BIG-DOWN when the number of frames exceed a predetermined number, the reverse traffic channel frame being transmitted from a mobile;

(c) raising the forward power by large power increasing value BIG-UP after the period of one frame when the EI bit is "1" in step (b), and performing the full-rate run routine;

(d) proceeding to a variable rate run routine when forward frame starts to be transmitted at a rate of below the full rate, and when full-rate transmission starts in the variable erasure run routine, returning to the full-rate run routine, reducing the forward power by small power decreasing value SMALL-DOWN when the EI bit starts to be received as "0" and the number of variable transmission frames is larger than a predetermined value, and entering a variable erasure run routine when the EI bit is received as "1"; and (e) returning to the full-rate run routine state when full-rate transmission starts in the variable erasure run routine, returning to the variable rate run routine when the EI bit is "0" and transmission starts at a rate of below the full rate, raising the forward power by small power increasing value SMALL-UP after the period of one frame when the EI bit is "1", and checking the EI bit to control the forward power after waiting of a predetermined period of time (FULL-WAIT)+1.

6. The method as claimed in claim 5, wherein the predetermined period time corresponds to a time during which the power control is carried out and the result of the power control is indicated in the EI bit of the reverse traffic channel frame.

* * * * *